(No Model.)

E. L. GOTTSCHALD.
METHOD OF MAKING FERRULES.

No. 396,037.            Patented Jan. 8, 1889.

WITNESSES:
Gustave Dieterich
T. F. Bourne

INVENTOR,
Ernst Louis Gottschald
BY Briesen, Steele & Knauth
ATTORNEYS.

United States Patent Office.

ERNST LOUIS GOTTSCHALD, OF DRESDEN, GERMANY, ASSIGNOR TO JOHN BISTER, OF BROOKLYN, NEW YORK, AND JOSEPH SCHMITT, OF HOBOKEN, NEW JERSEY.

METHOD OF MAKING FERRULES.

SPECIFICATION forming part of Letters Patent No. 396,037, dated January 8, 1889.

Application filed October 5, 1888. Serial No. 287,317. (No model.)

*To all whom it may concern:*

Be it known that I, ERNST LOUIS GOTTSCHALD, of Dresden, Germany, have invented certain new and useful Improvements in the Process of Manufacturing Ferrules for Canes and Umbrellas, of which the following is a specification.

The object of my invention is to provide an improved process of manufacturing ferrules for canes and umbrellas.

The invention consists in the details of improvement that will be more fully hereinafter set forth.

Reference is to be had to the accompanying drawings, forming part of this specification, in which—

Figure 1:
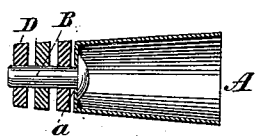
Figure 2:
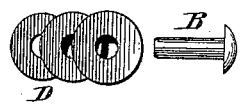
Figure 3:
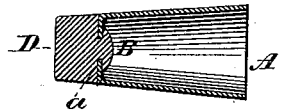

Figure 1 is a longitudinal section of a ferrule, showing the parts before they are welded together. Fig. 2 is a detail view showing the rivet and disks, and Fig. 3 is a longitudinal section of my improved ferrule when completed and ready for use.

In the accompanying drawings, the letter A represents a cap or tube that is closed at one end and open at the other end. This cap or tube A is the ferrule proper, and is adapted to be fitted on canes or umbrellas in the ordinary manner. The closed end of the cap A is provided with an aperture, *a*, through which a rivet, B, is to be passed. The rivet B is provided with a head that is adapted to fit closely against the inner closed end of the cap A, as in Fig. 1.

D are metallic disks or plates that are provided each with a central aperture to receive the rivet B. These plates may be made of any suitable material, but I prefer to use iron. The diameter and thickness of these disks D may vary, according to the style of tip desired on the ferrule.

In constructing my improved ferrule the rivet B is passed through the aperture *a* in the end of the cap A and the disks D, then slipped on the projecting end of the rivet, as in Fig. 1. Any desired number of disks D may be used. The cap A is then slipped on a mandrel or other suitable tool, so that the head of the rivet D shall rest against said mandrel or tool. The rivet and disks B D should be heated, either before they are placed together or afterward. The parts are then welded together while upon the mandrel—that is to say, the disks D and the rivet B are pressed into a compact mass by blows delivered upon the end of the rivet and the outer disk, so that the disks and the rivet will become firmly united together, similarly to that shown in Fig. 1; but this welding may be produced in any other suitable manner.

By the above construction I produce a ferrule with a tip or wearing-point that will not be easily detached from the ferrule proper and which will wear for a long time.

Having now described my invention, what I claim is—

The process herein described of manufacturing ferrules, which process consists in first passing a rivet through an aperture in the closed end of a ferrule, in then placing disks or plates on the projecting end of said rivet, and in then welding the rivet and disks together in a compact mass, substantially as described.

This specification signed by me this 4th day of September, 1888.

ERNST LOUIS GOTTSCHALD.

Witnesses:
AUG. FREUND,
EUG. HEYDE.